US012598274B2

(12) United States Patent
Urban et al.

(10) Patent No.: US 12,598,274 B2
(45) Date of Patent: *Apr. 7, 2026

(54) SYSTEMS AND METHODS FOR DYNAMIC POWER SHARING

(71) Applicant: Comcast Cable Communications, LLC, Philadelphia, PA (US)

(72) Inventors: David Urban, Cinnaminson, NJ (US); Bhupendar Singh, Devon, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 75 days.

This patent is subject to a terminal disclaimer.

(21) Appl. No.: 18/732,503

(22) Filed: Jun. 3, 2024

(65) Prior Publication Data

US 2024/0406352 A1 Dec. 5, 2024

Related U.S. Application Data

(63) Continuation of application No. 17/661,151, filed on Apr. 28, 2022, now Pat. No. 12,028,656, which is a continuation of application No. 17/247,421, filed on Dec. 10, 2020, now Pat. No. 11,330,232.

(51) Int. Cl.
*H04N 7/18* (2006.01)
*G08B 3/10* (2006.01)
*H04N 23/57* (2023.01)
*H04N 23/65* (2023.01)

(52) U.S. Cl.
CPC .............. *H04N 7/186* (2013.01); *G08B 3/10* (2013.01); *H04N 23/57* (2023.01); *H04N 23/65* (2023.01)

(58) Field of Classification Search
CPC ........ H04N 7/186; H04N 23/57; H04N 23/65; G08B 3/10; H02J 7/00308; H02J 50/10
See application file for complete search history.

(56) References Cited

U.S. PATENT DOCUMENTS

| | | | |
|---|---|---|---|
| 10,607,458 B1 | 3/2020 | Sampson et al. | |
| 10,609,344 B1 | 3/2020 | Tso | |
| 10,834,366 B1 * | 11/2020 | Tretiakov | H02M 7/44 |
| 11,164,435 B1 | 11/2021 | Skeoch | |
| 11,330,232 B1 | 5/2022 | Urban et al. | |
| 11,412,189 B1 * | 8/2022 | Skeoch | H04N 7/186 |
| 2021/0120212 A1 | 4/2021 | Kasmir | |
| 2021/0175792 A1 | 6/2021 | Kasmir | |
| 2021/0335106 A1 | 10/2021 | Wei | |
| 2022/0021767 A1 * | 1/2022 | Kasmir | H04M 11/025 |
| 2022/0256122 A1 | 8/2022 | Urban et al. | |

OTHER PUBLICATIONS

US Patent Application filed Apr. 28, 2022, entitled "Systems and Methods for Dynamic Power Sharing", U.S. Appl. No. 17/661,151.
US Patent Application filed Dec. 10, 2020, entitled "Systems and Methods for Dynamic Power Sharing", U.S. Appl. No. 17/247,421.

* cited by examiner

*Primary Examiner* — An T Nguyen
(74) *Attorney, Agent, or Firm* — BakerHostetler

(57) ABSTRACT

Systems and methods for managing current flow in a power circuit used to dynamically share power are disclosed. A Zener diode may automatically adjust current flow in the power circuit. If the power circuit has not received sufficient current for dynamic power sharing, the Zener diode may draw additional current from a power source. An electrical current in the power circuit may be divided into a plurality of current loads. Each of the plurality of current loads may be directed through a different path in the power circuit.

20 Claims, 4 Drawing Sheets

300

302

Receiving an electrical current from a power source

304

Determining a voltage in the power circuit exceeds a threshold

306

Sending additional current drawn from the power source

308

Causing the chime to output a notification

SYSTEMS AND METHODS FOR DYNAMIC POWER SHARING

CROSS REFERENCE TO RELATED APPLICATIONS

This application is a continuation of U.S. patent application Ser. No. 17/661,151, filed Apr. 28, 2022, now U.S. Pat. No. 12,028,656, which is a continuation of U.S. patent application Ser. No. 17/247,421, filed Dec. 10, 2020, now U.S. Pat. No. 11,330,232, each of which is hereby incorporated by reference in its entirety.

BACKGROUND

A device may require power sharing between more than one component. For example, a doorbell power circuit may need to share power between a notification component and a monitoring component. The device may also receive power from a power source that provides a limited amount of power. However, the limited amount of power may adversely affect performance of the device components. For example, the limited amount of power may not be sufficient to share power between the components. One or more of the components may consequently need to rely on a battery for additional power. Batteries may be costly, unsightly, or unreliable. For example, batteries may be unreliable when exposed to extreme weather in an outdoor environment. Therefore, improvements in dynamic power sharing techniques are needed.

SUMMARY

Systems and methods are disclosed for managing current flow in a power circuit used to dynamically share power. A power circuit may comprise a Zener diode. The Zener diode may be used to automatically adjust current flow in the power circuit. If the power circuit is not drawing enough current to dynamically share power, the Zener diode may draw additional current from a power source. A power circuit may comprise a resistor that divides current flow between more than one path in the circuit. The division of current flow may eliminate a need for additional battery-sourced power.

BRIEF DESCRIPTION OF DRAWINGS

The accompanying drawings, which are incorporated in and constitute a part of this specification, illustrate embodiments and together with the description, serve to explain the principles of the methods and systems.

DETAILED DESCRIPTION

A single device may require power sharing between two or more components of the device. For example, a device may require power sharing between a doorbell camera and a chime. The device may only receive a limited amount of power. For example, the device may only receive a limited amount of power from an AC power source or a DC power source. The limited amount of power may not be sufficient to share between two or more components of the device. For example, the limited amount of power may not be sufficient to simultaneously power both a doorbell camera and a chime. If the amount of power is not sufficient for power sharing, the device may need to rely on a battery for additional power. Additionally, if the amount of power is not sufficient to be shared between the two or more components, performance of one or more of the components may be negatively impacted. For example, one or more of the components may not be able to operate because it is not receiving enough power. Thus, it may be desirable to provide a mechanism to manage current flow in a power circuit that supplies power to more than one component of a device. Disclosed herein are systems and methods for managing current flow in a power circuit used to dynamically share power without the need for a battery.

Figure 1:
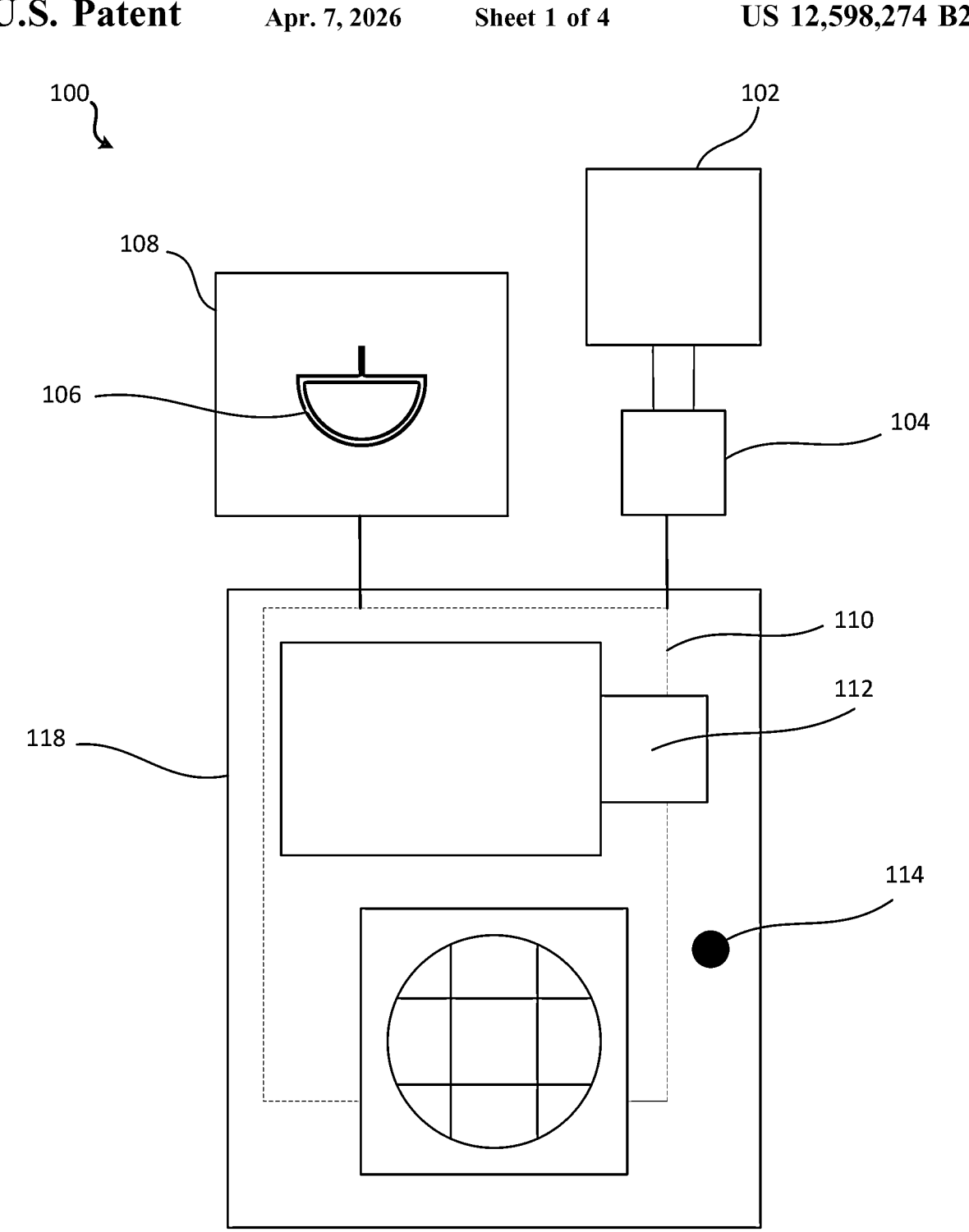
FIG. 1 illustrates a block diagram of an example device according to an embodiment of the present disclosure.

FIG. 1 illustrates an exemplary device 100 suitable for dynamic power sharing. For example, the device 100 may be a home security system such as a doorbell system or an outdoor camera or motion detector that activates an indoor monitor, chime, or alarm. The device 100 may be connected to a power source 102. For example, the power source 102 may be an external power source providing alternating current (AC). The device 100 may also comprise a transformer 104. The transformer 104 may be connected to the power source 102. The transformer 104 may, for example, be a step-down transformer. The device 100 may draw power from the power source 102. For example, the device 100 may draw power from the power source 102 through the transformer 104. A voltage output of the transformer 104 may decrease as higher current is drawn from the transformer 104.

Figure 2:
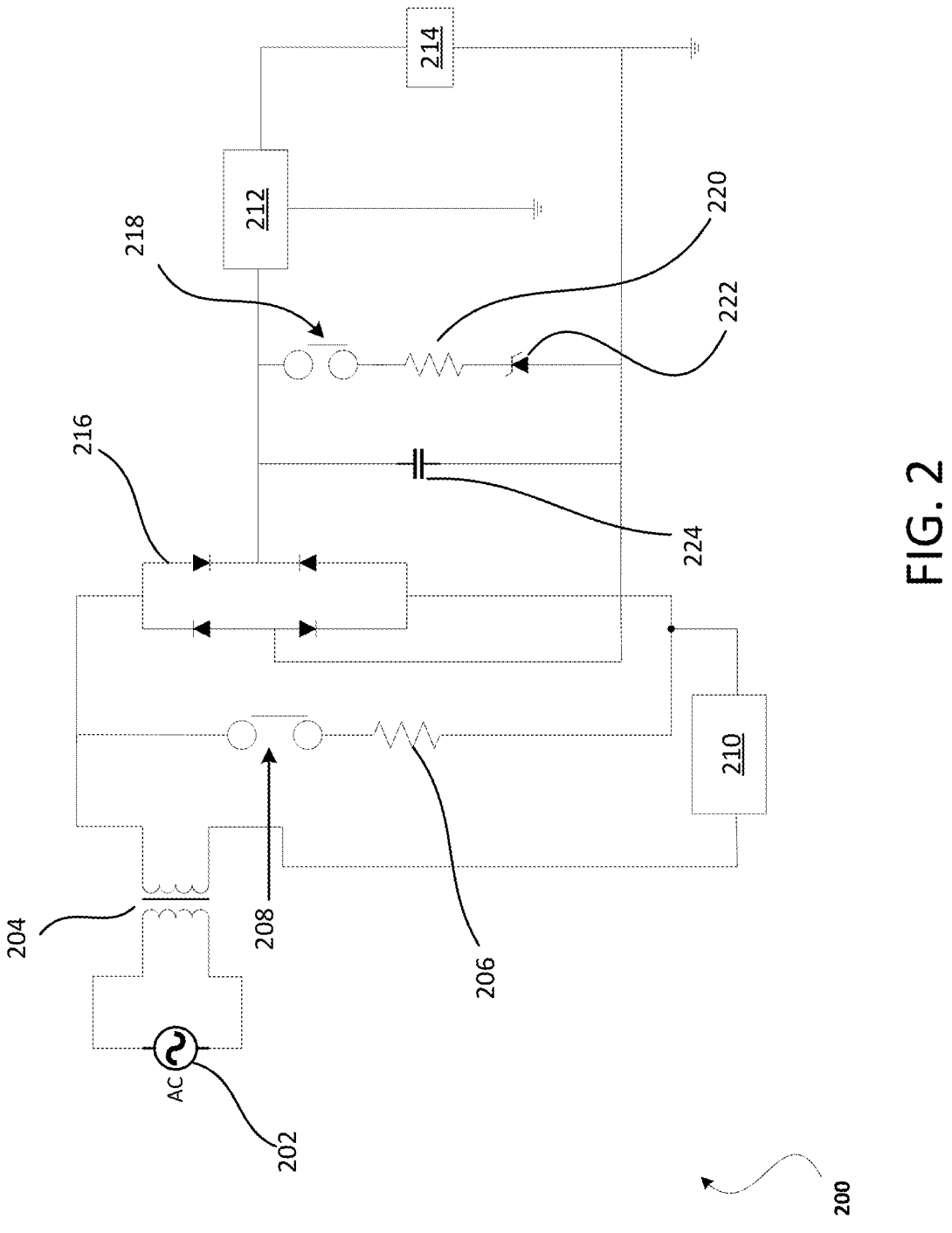
FIG. 2 illustrates a block diagram of an example power circuit according to an embodiment of the present disclosure.

The device 100 may comprise a power circuit 110. The power circuit 110 may be in electrical communication with the power source 102 and may receive an electrical current from the power source 102. FIG. 2, discussed below, shows an exemplary power circuit for delivering an electrical current to a device, such as the device 100. The power circuit 110 may dynamically share power between two or more components of the device 100. For example, the power circuit 110 may dynamically share power between a component 106 and a component 112. If the device 100 is a doorbell system, the component 106 may be a chime and the component 112 may be a doorbell camera. If the component 106 is a chime, the chime may be an electronic chime with a speaker or a mechanical chime.

The device 100 may comprise a first housing 108. For example, the first housing 108 may enclose the component 106. The device 100 may comprise a second housing 118. The second housing 118 may, for example, enclose the component 112 and the power circuit 110. The device 100 may comprise a button 114. For example, if the device 100 comprises the second housing 118, the button 114 may be located outside of the second housing 118. If the component 106 is a chime, the button 114 may be configured to cause the component 106 to output a notification when the button 114 is actuated.

FIG. 2 shows an exemplary power circuit 200 adapted to deliver current to a device, such as that depicted in FIG. 1. The power circuit 200 may dynamically share power between two or more components of a device, such as the device 100 depicted in FIG. 1. For example, the power circuit 200 may dynamically share power between a component 210 and a component 214. If the device is a doorbell system, the component 210 may be a chime and the component 214 may be a doorbell camera. If the component 210 is a chime, the chime may be an electronic chime with a speaker or a mechanical chime.

The power circuit 200 may be in electrical communication with a power source 202 and may receive an electrical current from the power source 202. For example, the power source 202 may be an AC power source, such as power running through a home or commercial building. If the power source 202 is an AC power source, the power circuit 200 may receive, from the power source 202, an alternating electric current that periodically reverses direction and changes its magnitude continuously with time. The alternating electric current may have a sinusoidal waveform, whose positive half corresponds with the positive direction of the current and whose negative half corresponds with the negative direction of the current.

The power source 202 may be connected to a transformer 204, such as an AC transformer. The power circuit 200 may draw the electrical current from the power source 202 through the transformer 204. The transformer 204 may be a step-down transformer. If the transformer 204 is a step-down transformer, the transformer 204 may reduce the voltage of the power circuit 200. For example, the transformer 204 may reduce the voltage from AC power source 202 for the power circuit 200 from 120V down to 24V or 16V.

After the electrical current is drawn through the transformer 204, the electrical current may flow through the power circuit 200 in order to power at least one component of a device, such as the component 210 or the component 214. The power circuit 200 may comprise a first switch 208 and a second switch 218. If both the first switch 208 and the second switch 218 are open, the electrical current powering the component 214 will flow through the component 210 but may not be sufficient current to activate component 210.

The component 214 may require DC power in order to operate. If the component 214 requires DC power in order to operate and the power source 202 is an AC power source, the alternating electrical current received from the power source 202 may need to be converted from AC to DC. In contrast to alternating current which periodically reverses direction and changes its magnitude continuously with time, DC current is constant. A bridge rectifier, such as the bridge rectifier 216, may be used to convert the electrical current from AC to DC. The bridge rectifier may comprise at least four diodes or any other controlled solid-state switches. Because a diode is a unidirectional device that allows current flow in only one direction, a bridge rectifier comprising at least four diodes may be used to produce unidirectional, or direct, current. The alternating electrical current received from the power source 202 may enter the bridge rectifier where it is converted from AC to DC. The DC current may exit the bridge rectifier and be used to power the component 214. The power circuit 200 may also comprise a capacitor, such as the capacitor 224, that may be used for smoothing. The capacitor may smooth out fluctuations in voltages in the power circuit 200. The capacitor 224 may be connected in a parallel path to the resistors 206, 220. The power circuit may also comprise a DC/DC regulator, such as the DC/DC regulator 212. The DC/DC regulator 212 may be used to convert the smoothed voltage that has passed through the bridge rectifier 216 to a constant DC voltage.

If the first switch 208 is closed, the electrical current flow to the component 210 may increase and electrical current may flow to the component 214 as well. For example, closing the first switch 208 may cause a bypass path to be created in the power circuit 200. The electrical current flowing from the power source 202 may be split, with some electrical current flowing through the bypass path and the remainder of the electrical current flowing through the bridge rectifier 216. The electrical current that flows through the bridge rectifier 216 may continue to the component 214 and then combine with the electrical current flowing through the bypass path before the combination of electrical current flows through the component 210. This combination of electrical current may power the component 210.

Resistor 206 may be located on the bypass path to effectively reduce the resistance seen by the source, such as the transformer 204. Since current is equal to voltage divided by resistance (I=V/R), the lower resistance seen by the source may cause a higher current flow through the bypass path. However, if the resistance value of the resistor is too low, too much current may flow through the bypass path and not enough current may flow through the bridge rectifier 216 to power the component 214. Accordingly, the resistance value of the resistor must be selected so that enough current flows through the bridge rectifier 216 to power the component 214. The power circuit 200 may also comprise a second switch 218 and a diode 222, such as a Zener diode. If the second switch 218 is closed, some current may flow through the diode 222 to the component 210 of the device. If current flows through the diode 222, this current will have already flowed through the bridge rectifier and been converted to DC current. The diode 222 may be connected in series to a resistor 220. The resistor 220 may lower a required power rating of the diode 222. If the diode 222 is connected in series to the resistor 220 and if the second switch 218 is closed, some current may flow through the diode 222 and the resistor 220.

Whether current flows through the diode 222 to the component 210 depends on whether the component 214 is drawing a high amount of current or a low amount of current. For example, the component 214 may be drawing a high amount of current if it is in a high-power mode, and the component 214 may be drawing a low amount of current if it is in a low power mode. The amount of current drawn by the component 214 may vary depending on whether different functions of the component 214 are active at a given time and may also vary depending on environmental conditions such as temperature or the amount of daylight or darkness. Current may flow through the diode 222 if additional current is needed in the circuit 200.

For example, if the component 214 is drawing a low amount of current into the circuit 200 when the component 210 is activated, there may not be enough current present in the circuit 200 to power the component 210 while continuing to power the component 214. For example, the component 214 may be a doorbell camera and the component 210 may be a chime. If the doorbell camera is drawing a low amount of current into the circuit when the button is pressed, there may not be enough current present in the circuit 200 to make the chime output a notification while still powering the doorbell camera. When the component 210 is activated, the component 214 may not automatically begin operating in a high-power mode. Accordingly, more current may need to be drawn into the circuit 200 and current may flow through the diode 222.

If the component 214 is drawing a high amount of current into the circuit 200 when the component 210 is activated, there may already be enough current present in the circuit to power the component 210 while continuing to power the component 214. For example, the component 214 may be a doorbell camera and the component 210 may be a chime. If the doorbell camera is drawing a high amount of current into the circuit when the button is pressed, there may already be enough current present in the circuit to make the chime output a notification while still powering the doorbell camera. Additional current may not need to be drawn into the circuit 200, so current may not flow through the diode 222.

Because the amount of current drawn by the component 214 may vary, it may be difficult to select an appropriate resistance value for the resistor 206 located on the bypass path. Because the resistance value of the resistor located on the bypass path cannot be varied without additional circuitry to monitor and control power levels, a way to account for the variability of the current being drawn by the component 214 is needed.

If the diode 222 is a Zener diode, the diode 222 may account for the variability of the current being drawn by the component 214. A Zener diode is a semiconductor device that permits current to flow in either a forward or reverse direction. The Zener diode consists of a heavily doped p-n junction designed to conduct electrical current in the reverse direction when a certain specified voltage is reached. The Zener diode 222 has a predetermined reverse-breakdown voltage, at which it becomes activated and starts conducting current and continues operating continuously in the reverse-bias mode without getting damaged.

If the component 214 is drawing a high amount of current, the Zener diode 222 may appear as an open circuit because the voltage into the Zener diode 222 may be below a threshold, such as the reverse-breakdown voltage. If the Zener diode 222 appears as an open circuit, the Zener diode 222 has not been activated and current may not flow through the Zener diode 222. In this case, the component 214 is already drawing enough current such that, when additional current flows through switch 208 and resistor 206, no additional current needs to be drawn through the Zener diode 222 to activate the component 210. Conversely, if the component 214 is drawing a low amount of current, the Zener diode 222 may be activated and additional current may flow through the Zener diode 222. This additional current may be needed in order to activate the component 210. The amount of additional current that will flow through the Zener diode 222 may be equal to the amount of additional current needed to reach a threshold, such as the reverse-breakdown voltage. Once the threshold is reached, no more additional current may be drawn through the Zener diode 222, effectively clamping the voltage at the threshold level.

Closing the first switch 208 and closing the second switch 218 may be accomplished by receiving an indication to cause a chime to output a notification. For example, the indication to cause the chime to output a notification may be received when a doorbell button, such as the button 114, is pressed. Closing the first switch 208 and the second switch 218 may be accomplished simultaneously. For example, if the device is a doorbell system, closing the first switch 208 and the second switch 218 may be accomplished simultaneously by receiving a single indication to cause a chime to output a notification. If the device is a doorbell system, receiving the single indication to cause the chime to output a notification may comprise actuating a button of the doorbell system.

Figure 3:
FIG. 3 illustrates a flow chart of an example method according to an embodiment of the present disclosure.
Figure 3:
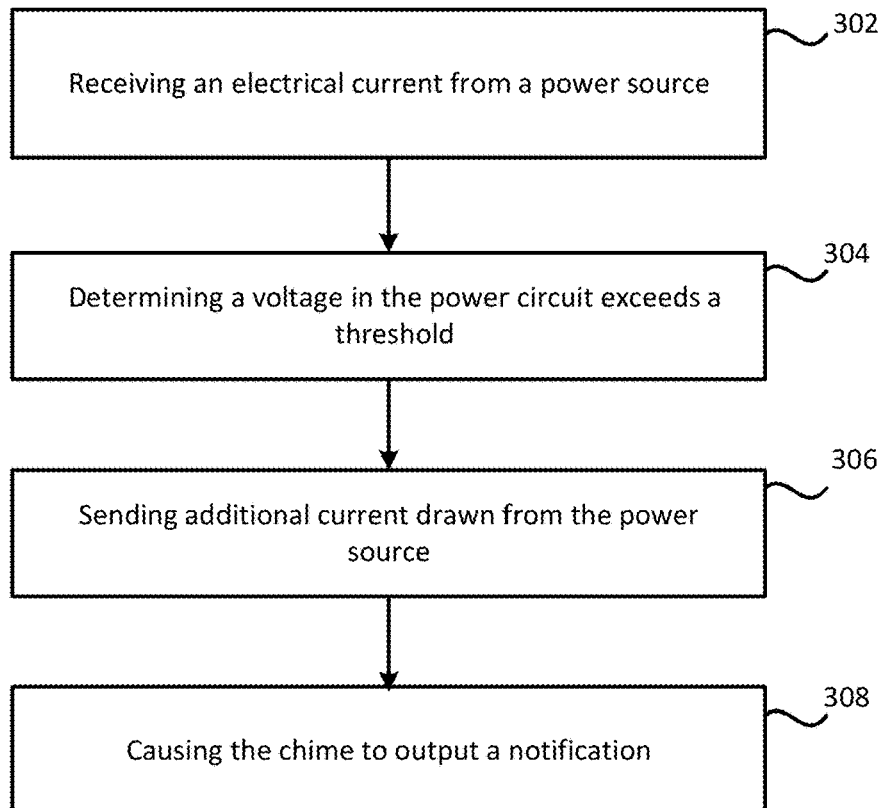

FIG. 3 illustrates an example method 300 by which current flow in a power circuit, such as the power circuit 200 of FIG. 2, may be managed. The method 300 may manage current flow in a power circuit that dynamically shares power between more than one component of a device. For example, the power circuit may be a doorbell camera power circuit that dynamically shares power between a chime and a doorbell camera. As discussed above, a component of the device, such as the component 214 of FIG. 2, may draw different amounts current at any given time. For example, the component may draw different amounts of current depending on whether different functions of the component are active at a given time or depending on environmental conditions. Because the amount of current drawn by the component may vary at any given time, a way to account for the variability of the current being drawn by the component is needed. A diode, such as the diode 222, may be placed in the power circuit to account for the variability of the current being drawn by the component. For example, the diode may be a Zener diode that draws more current into the power circuit when the component is drawing a low amount of current into the power circuit.

At step 302, an electrical current from a power source may be received. The electrical current from the power source may be received by the power circuit. For example, the electrical current may be an alternating current (AC) load and the power source may be an AC power source. The power circuit may draw the electrical current from the power source through a transformer, such as the transformer 204. After the electrical current is drawn through the transformer, the electrical current may flow through the power circuit in order to power more than one component of a device, such as the components 210 and 214.

As discussed above, one or more of the components powered by the power circuit may require DC power in order to operate. If this is the case, at least a portion of the alternating electrical current received from the power source may need to be converted from AC to DC. A bridge rectifier, such as the bridge rectifier 216, may be used to convert the electrical current from AC to DC. The electric current from the power source may flow through the power circuit. At least a portion of the electric current in the power circuit may flow through a first component of the device, such as the component 214, that draws variable amounts of current. All of the electric current from the power source may flow through a second component of the device, such as the component 210. For example, the electrical current flowing from the power source may be split, with some electrical current flowing through a bypass path to the component 210 and the remainder of the electrical current flowing through the component 214. The remainder of the electrical current that flows through the component 214 may be combined with the electrical current flowing through the bypass path and the combination of electrical current may flow through the component 210.

At step 304, it may be determined that a voltage in the power circuit exceeds a threshold, such as a fixed reverse-breakdown voltage of the Zener diode. It may be determined that the voltage exceeds the threshold by receiving an indication to cause a chime to output a notification. When the indication to cause the chime to output a notification is received, at least one switch, such as the switch 218 or the switch 208, in the power circuit may be closed. If the device is a doorbell system, receiving the indication to cause the chime to output a notification may comprise actuating a button of the doorbell system.

If the voltage exceeds the threshold, this may indicate that the Zener diode 222 needs to draw more current into the power circuit. The voltage may exceed the threshold when the first component of the device, such as the component 214, is in a low power mode. If the device is a doorbell system, the first component of the device may be a doorbell camera. If the first component of the device is in a low power mode, the first component of the device may be drawing a low amount of current. As discussed above, the current drawn by the first component of the device may be combined with current flowing through a bypass path in the power circuit before the combined current flows through a second component of the device, such as the component 210. If the device is a doorbell system, the second component of the device may be a chime. As discussed above, if the first component is drawing a low amount of current into the power circuit when the second component is activated, there may not be enough current present in the power circuit to power the second component while continuing to power the first component. For example, the low amount of current being drawn by the first component may not be sufficient, when combined with the current flowing through the bypass path, to power the second component of the device. When the second component is activated, the first component may not automatically begin operating in a high-power mode. In this case, additional current may need to be drawn into the power circuit. This additional current may be drawn into the power circuit by the Zener diode 222.

If the first component is already drawing a high amount of current into the power circuit when the second component is activated, there may already be enough current present in the circuit to power the second component while continuing to power the first component. For example, the high amount of current being drawn by the first component may be sufficient, when combined with the current flowing through the bypass path, to power the second component of the device. Additional current may not need to be drawn into the power circuit, so the Zener diode 222 may not draw additional current into the power circuit.

At step 306, additional current drawn from the power source may be sent to the power circuit. The amount of additional current drawn from the power source may be equal to the amount of current necessary to lower the voltage in the power circuit to the threshold. For example, the amount of additional current drawn from the power source may be equal to the amount of current needed to lower the voltage in the power circuit to a voltage threshold of the Zener diode. When combined with the current flowing through the bypass path and the low amount of current being drawn by the first component, the additional current may be sufficient to power the second component of the device. This additional current may be drawn from the power source by the Zener diode.

At step 308, the second component of the device may be caused to output a notification. If the device is a doorbell system and the second component of the device is a chime, the chime may be caused to output a notification. For example, the chime may be caused to output the notification when a button, such as the button 114, associated with the chime is actuated. Accordingly, the method 300 may be used to cause the second component of the device to output the notification while the first component of the device is still operating in a low-power mode and drawing low amounts of current.

Figure 4:
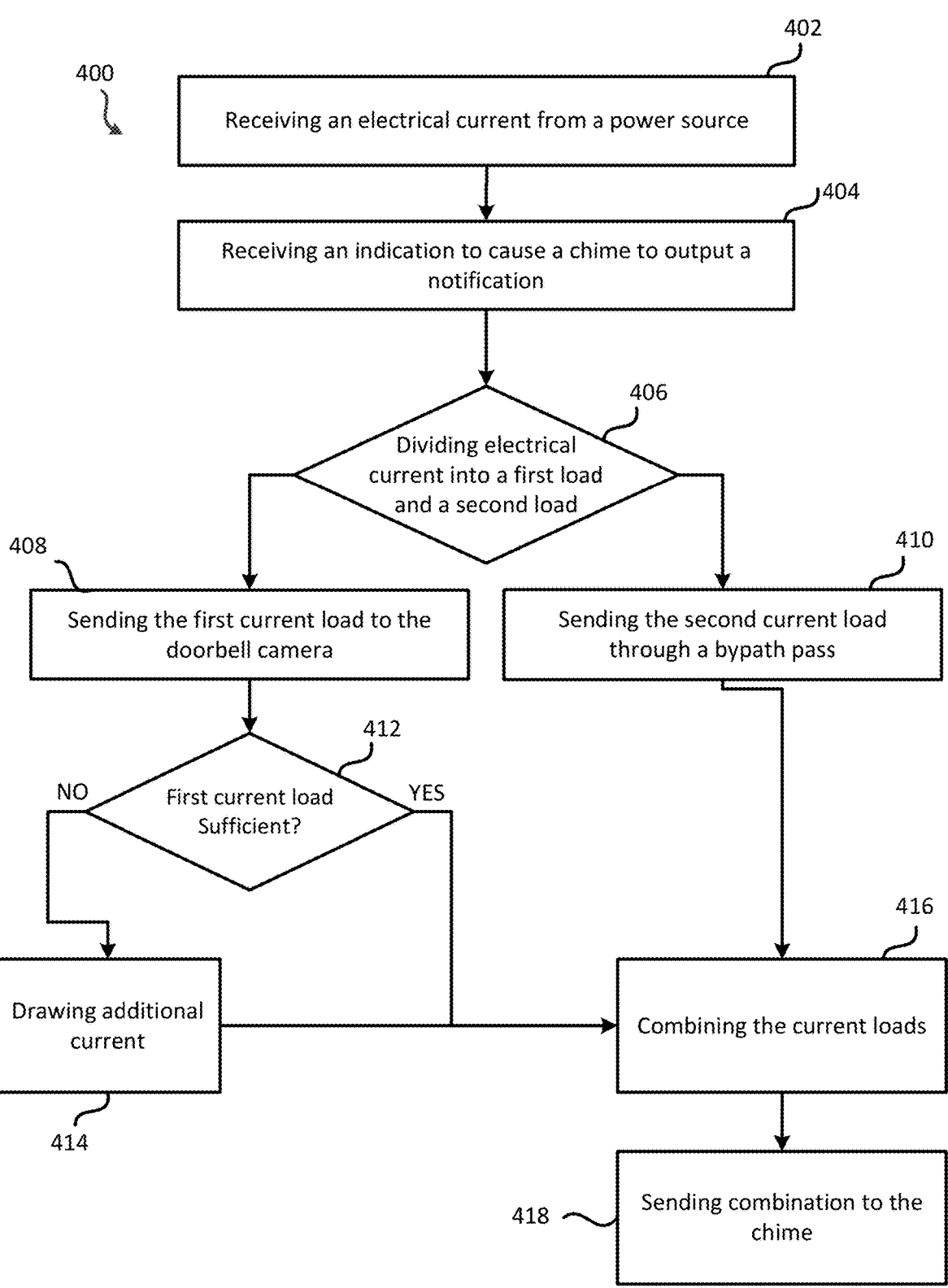
FIG. 4 illustrates a flow chart of an example method according to an embodiment of the present disclosure.

FIG. 4 illustrates an example method 400 by which current flow in a power circuit, such as the power circuit 200 of FIG. 2, may be managed. The method 400 may manage current flow in a power circuit that dynamically shares power between more than one component of a device, such as the components 210 and 214. For example, the power circuit may be a doorbell camera power circuit that dynamically shares power between a chime and a doorbell camera. The power circuit may comprise a switch, such as the first switch 208. If the switch is closed, all of the electrical current in the power circuit may flow through a second component of the device, such as the component 210, and a portion of the electrical current in the power circuit will flow through a first component of the device, such as the component 214. For example, closing the switch may cause a bypass path to be created in the power circuit. The electrical current flowing from a power source, such as the power source 202, may be split, with some electrical current flowing through the bypass path and the remainder of the electrical current flowing through the first component of the device. The remainder of the electrical current that flows through the first component of the device may then combine with the electrical current flowing through the bypass path before the combination of electrical current flows through the second component of the device. This combination of electrical current may power the second component of the device.

At step 402, an electrical current may be received from a power source. The electrical current may be received by the power circuit. For example, the power source may be an AC power source. The power circuit may draw the electrical current from the power source through the transformer 204. After the electrical current is drawn through the transformer 204, the electrical current may flow through the power circuit in order to power more than one component of a device, such as the components 210 and 214.

At step 404 an indication may be received to cause a second component of the device, such as the component 210, to output a notification. If the device is a doorbell system, the second component may be a chime and the indication may be received from the doorbell system. If the device is a doorbell system, receiving the indication to cause the chime to output a notification may comprise actuating a button of the doorbell system. When the indication to cause the second component of the device to output a notification is received, a bypass path in the power circuit may be created. The bypass path may be created by closing a switch, such as the first switch 208, in the power circuit. When the indication to cause the second component of the device to output a notification is received, the switch may simultaneously close. The bypass path may include a resistor, such as the resistor 206.

At step 406, the electrical current may be divided into a plurality of current loads. For example, the electrical current may be divided into at least a first current load and a second current load. Division of the electrical current into the plurality of current loads may be accomplished using the resistor located on the bypass path. The resistor may have a resistance value that can be selected to affect how much of the electrical current is divided into the first current load and how much of the electrical current is divided into the second current load. For example, if the second current load flows through the bypass path and the resistor has a high resistance value, a relatively small amount of the electrical current may flow through the bypass path. If the resistor has a low resistance value, a relatively larger amount of electrical current may flow through the bypass path. Accordingly, the higher the resistance value of the resistor, the smaller the portion of electrical current in second current load and the larger the portion of electrical current in first current load.

At step 408, a first of the plurality of current loads, such as the first current load, may be sent to a first component of the device, such as the component 214. If the device is a doorbell system, the first component of the device may be a doorbell camera. The first of the plurality of current loads may comprise current sufficient to cause the first component of the device to operate without using a battery. Sending the first of the plurality of current loads to the first component of the device may comprise directing the first of the plurality of current loads through a path in the power circuit. The path may be connected in a parallel path to the bypass path. If the first component of the device requires DC power to operate, the path may comprise the bridge rectifier 216 to convert the electrical current directed though the path from AC current into DC current.

At step 410, a second of the plurality of current loads, such as the second current load, may be sent through the bypass path in the power circuit. The second current load may be combined with the first current load, which has already flown through the first component of the device, before the combination of electrical current flows through the second component of the device. In this way, all of the electrical current in the power circuit will flow through the second component of the device and only a portion of the electrical current in the power circuit will flow through the first component of the device.

At step 412, it may be determined whether the first of the plurality of current loads comprises a sufficient amount of current. For example, it may be determined whether the first of the plurality of current loads, when combined with the second of the plurality of current loads, comprises enough current to cause the second component of the device to output a notification without using a battery. If a voltage in the power circuit exceeds a threshold, such as a predetermined reverse-breakdown voltage of a Zener diode located on the path in the power circuit, the first of the plurality of current loads does not comprise a sufficient amount of current. If a voltage in the power circuit does not exceed a threshold, such as the predetermined reverse-breakdown voltage of the Zener diode located on the path in the power circuit, the first of the plurality of current loads comprises a sufficient amount of current.

If it is determined that the first of the plurality of current loads does not comprise a sufficient amount of current, the method 400 may proceed to step 414. At step 414, additional current may be drawn from the power source. The additional current may be drawn through the Zener diode. For example, the additional current may be drawn through the Zener diode using the method 300 of FIG. 3. The amount of additional current drawn from the power source may be equal to the amount of current necessary to lower the voltage in the power circuit to the threshold. The amount of current necessary to lower the voltage in the power circuit to the threshold may be equal to the additional amount of current needed, when combined with the first and second current loads, to power the second component of the device. Accordingly, the amount of additional current drawn from the power source may be equal to the difference between the first of the plurality of current loads plus the second of the plurality of current loads and the amount of current necessary to cause the second component of the device to output a notification without using a battery.

At step 416, the plurality of current loads may be combined. If no additional current was drawn from the power source at step 414, the first current load and the second current load may be combined. If additional current was drawn at step 414, the additional current may be combined with the first current load and the second current load. At step 418, the combination of current loads may be sent to the second component of the device. The combination of current loads may comprise current sufficient to cause the second component of the device to output a notification without using a battery. If the second component of the device is a doorbell chime and the first component of the device is a doorbell camera, the combination of current loads may comprise current sufficient to cause the chime to output a notification while the camera is capturing video.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:

sending, by a power circuit associated with a device and to a first component of the device, a first current load, wherein the first current load is sufficient to power the first component of the device without using a battery;

receiving an indication that a second component of the device is to be activated; and sending, based on the indication that the second component of the device is to be activated, a combination of the first current load and a second current load, wherein the combination is sufficient to power the second component of the device without using a battery.

2. The method of claim 1, wherein the first current load comprises current sufficient to power the first component of the device when the combination is sent to the second component of the device to power the second component of the device.

3. The method of claim 1, wherein the combination comprises current sufficient to power the second component of the device when the first current load is sent to the first component of the device to power the first component of the device.

4. The method of claim 1, wherein sending the combination comprises directing the second current load through a bypass path in the power circuit.

5. The method of claim 4, wherein sending the first current load comprises directing the first current load through a second path in the power circuit, the second path connected in a parallel path to the bypass path.

6. The method of claim 1, wherein the first component of the device comprises a doorbell camera, the second component of the device comprises a doorbell chime, and the power circuit is electrically coupled to the doorbell chime and the doorbell camera.

7. A device comprising:

a first component;

a second component; and a power circuit electrically coupled to the first component and the second component, the power circuit in electrical communication with a power source, wherein the device is configured to cause the power circuit to:

send, to the first component, a first current load, wherein the first current load is sufficient to power the first component without using a battery;

receive an indication that the second component is to be activated; and send, based on the indication that the second component is to be activated, a combination of the first current load and a second current load, wherein the combination is sufficient to power the second component without using a battery.

8. The device of claim 7, wherein the first current load comprises current sufficient to power the first component of the device when the combination is sent to the second component of the device to power the second component of the device.

9. The device of claim 7, wherein the combination comprises current sufficient to power the second component of the device when the first current load is sent to the first component of the device to power the first component of the device.

10. The device of claim 7, wherein the device is configured to send the combination by directing the second current load through a bypass path in the power circuit.

11. The device of claim 10, wherein the device is configured to send the first current load by directing the first current load through a second path in the power circuit, the second path connected in a parallel path to the bypass path.

12. The device of claim 7, wherein the first component comprises a doorbell camera and the second component comprises a doorbell chime.

13. The device of claim 7, wherein the power source is an AC power source.

14. A system comprising:

a first component;

a second component;

a power source; and a power circuit electrically coupled to the first component and the second component, the power circuit in electrical communication with the power source, wherein the power circuit is configured to:

send, to the first component, a first current load, wherein the first current load is sufficient to power the first component without using a battery;

receive an indication that the second component is to be activated; and send, based on the indication that the second component is to be activated, a combination of the first current load and a second current load, wherein the combination is sufficient to power the second component without using a battery.

15. The system of claim 14, wherein the first current load comprises current sufficient to power the first component when the combination is sent to the second component to power the second component.

16. The system of claim 14, wherein the combination comprises current sufficient to power the second component when the first current load is sent to the first component to power the first component.

17. The system of claim 14, wherein the power circuit is configured to send the combination by directing the second current load through a bypass path in the power circuit.

18. The system of claim 17, wherein the power circuit is configured to send the first current load by directing the first current load through a second path in the power circuit, the second path connected in a parallel path to the bypass path.

19. The system of claim 14, wherein the first component comprises a doorbell camera and the second component comprises a doorbell chime.

20. The system of claim 14, wherein the power source is an AC power source.

* * * * *